United States Patent
Storrie

(10) Patent No.: US 8,738,741 B2
(45) Date of Patent: May 27, 2014

(54) BROKERING NETWORK RESOURCES

(71) Applicant: Rockstar Consortium US, L.P., Richardson, TX (US)

(72) Inventor: John Storrie, Maidenhead (GB)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/652,109

(22) Filed: Oct. 15, 2012

(65) Prior Publication Data

US 2013/0132563 A1    May 23, 2013

Related U.S. Application Data

(63) Continuation of application No. 10/964,466, filed on Oct. 13, 2004, now Pat. No. 8,291,044.

(51) Int. Cl.
*G06F 15/16* (2006.01)
*H04L 29/08* (2006.01)

(52) U.S. Cl.
CPC .................... *H04L 67/2809* (2013.01)
USPC ........... 709/219; 709/217; 709/218; 709/223; 709/224; 709/225; 709/226

(58) Field of Classification Search
CPC .................................................. H04L 67/2809
USPC .................... 709/217–219, 223–226
See application file for complete search history.

(56) References Cited

U.S. PATENT DOCUMENTS

| | | | | |
|---|---|---|---|---|
| 6,055,571 A | * | 4/2000 | Fulp et al. | 709/224 |
| 2001/0027484 A1 | * | 10/2001 | Nishi | 709/223 |
| 2001/0047395 A1 | * | 11/2001 | Szutu | 709/217 |
| 2004/0024846 A1 | * | 2/2004 | Randall et al. | 709/219 |
| 2004/0066916 A1 | * | 4/2004 | Brown et al. | 379/88.01 |
| 2004/0249927 A1 | * | 12/2004 | Pezutti | 709/223 |
| 2006/0026087 A1 | * | 2/2006 | Lin | 705/37 |
| 2006/0126536 A1 | * | 6/2006 | Patel et al. | 370/254 |
| 2006/0233137 A1 | * | 10/2006 | Dantu et al. | 370/331 |
| 2008/0040469 A1 | * | 2/2008 | Nishi | 709/223 |
| 2008/0183628 A1 | * | 7/2008 | Oliver et al. | 705/71 |

FOREIGN PATENT DOCUMENTS

| | | | | |
|---|---|---|---|---|
| EP | 1780971 | | 5/2007 | |
| EP | 1780971 A1 | * | 5/2007 | H04L 29/12 |
| GB | 2411329 | | 8/2005 | |
| GB | 2411329 A | * | 8/2005 | H04N 7/173 |

* cited by examiner

*Primary Examiner* — Mohamed Wasel

(57) ABSTRACT

A method of brokering a network resource 10 includes providing a service broker processor 12 and a service broker registry 13. On receiving a request at the service broker processor to register a network resource to provide a network service, the service broker processor authenticates the request and authorises registration in the service broker registry. A network client 14 is updated with the availability of the registered network resource so that on receiving a third party request for the network service, the network client requests allocation of the registered network resource. A bearer path 54 is set up between the third party 21 and the network resource 10 to provide the requested network service.

28 Claims, 6 Drawing Sheets

BROKERING NETWORK RESOURCES

CROSS-REFERENCE TO RELATED APPLICATIONS

This application is a continuation of U.S. patent application Ser. No. 10/964,466, filed Oct. 13, 2004 (now U.S. Pat. No. 8,291,044), entitled "BROKERING NETWORK RESOURCES." U.S. patent application Ser. No. 10/964,466 is assigned to the assignee of the present application and is incorporated by reference into this disclosure as if fully set forth herein. This disclosure hereby claims priority under 35 U.S.C. §120 to U.S. patent application Ser. No. 10/964,466.

FIELD OF THE INVENTION

This invention relates to communication networks and in particular to brokering network resources on a communication network.

BACKGROUND OF THE INVENTION

When an end-user seeks network services or resources, such as teleconferencing, voicemail and database services, from a network operator, the network operator creates a bespoke solution by approaching individual vendors and obtaining the required services from different vendors to create a multi-vendor solution. The network operator cannot obtain the services from a single source.

That is, the network resources are held in closed environments which are proprietary implementations, so that the network resources are not available, or even visible, to other users.

Moreover, the same network resources are replicated to provide services to different users, for example in different time zones, even although a network resource in one time zone may be idle while a corresponding network resource in another time zone is in use, and vice versa.

It is desirable to maximise use of network resources and bandwidth, to make different services available from a single source and, in particular, to avoid unnecessary multiplication of network resources.

SUMMARY OF THE INVENTION

According to a first aspect of the invention, there is provided a method of brokering, a network resource comprising the steps of: providing a service broker processor and a service broker registry; receiving a request at the service broker processor to register in the service broker registry a network resource for providing a network service; the service broker processor authenticating the request and authorising registration to establish an authenticated and authorised network resource; the service broker processor registering the authenticated and authorised network resource in the service broker registry to establish a registered network resource; the service broker processor updating a network client with the availability of the registered network resource; the network client receiving a third party request for the said network service; the network client requesting allocation of the registered network resource; and the network client setting up a bearer path between the third party and the network resource.

Advantageously, the method comprises an additional step of providing a resource manager and the resource manager checking a status of the registered network resource before updating the network client with the availability of the registered network resource.

Preferably, the method comprises a further step of the service broker processor monitoring availability of the registered network resource.

Conveniently, the step of updating a network client includes the network client activating the service provided by the registered network resource.

Advantageously, the step of the network client requesting allocation of the registered network resource includes the network client determining the availability of the registered network resource.

Advantageously, the step of the network client requesting allocation of the registered network resource comprises the network client requesting allocation of a plurality of registered network resources to provide the said network service by succession brokering of the plurality of registered network resources.

Preferably the step of the network client setting up a bearer path includes the step of the network client monitoring use of the network resource and billing the third party user.

According to a second aspect of the invention, there is provided a method of registering a network resource comprising the steps of: providing a service broker processor and a service broker registry; receiving a request at the service broker processor to register in the service broker registry a network resource for providing a network service; the service broker processor authenticating the request and authorising registrations to establish an authenticated and authorised network resource; and the service broker processor registering the authenticated and authorised network resource in the service broker registry to establish a registered network resource.

Advantageously, the method comprises an additional step of providing a resource manager and the resource manager checking a status of the registered network resource before updating the network client with the availability of the registered network resource.

Preferably, the method comprises a further step of the service broker processor monitoring availability of the registered network resource.

Conveniently, the step of updating a network client includes the network client activating the service provided by the network resource.

According to a third aspect of the invention, there is provided a method of requesting a network service from a network client comprising the steps of: providing a service broker processor and a service broker registry containing an authenticated and authorised registered network resource for providing the network service; the network client receiving a third party request for the said network service; the network client requesting allocation of the registered network resource; and the network client setting up a bearer path between the third party and the network resource.

Conveniently, the step of the network client requesting allocation of the registered network resource includes the network client determining the availability of the registered network resource.

Advantageously, the step of the network client requesting allocation of the registered network resource comprises the network client requesting allocation of a plurality of registered network resources to provide the said network service by succession brokering of the plurality of registered network resources.

Preferably, the step of the network client setting up a bearer path includes the step of the network client monitoring use of the network resource and billing the third party user.

According to a fourth aspect of the invention, there is provided computer executable software code stored on a computer readable medium, the code being for brokering a network resource comprising the steps of: providing a service broker processor and a service broker registry; receiving a request at the service broker processor to register in the service broker registry a network resource for providing a network service; the service broker processor authenticating the request and authorising registration to establish an authenticated and authorised network resource; the service broker processor registering the authenticated and authorised network resource in the service broker registry to establish a registered network resource; the service broker processor updating a network client with the availability of the registered network resource; the network client receiving a third party request for the said network service; the network client requesting allocation of the registered network resource; and the network client setting up a bearer path between the third party and the network resource.

According to an fifth aspect of the invention, there is provided one or more programmed computers for brokering a network resource comprising the steps of: providing a service broker processor and a service broker registry; receiving a request at the service broker processor to register in the service broker registry a network resource for providing a network service; the service broker processor authenticating the request and authorising registration to establish an authenticated and authorised network resource; the service broker processor registering the authenticated and authorised network resource in the service broker registry to establish a registered network resource; the service broker processor updating a network client with the availability of the registered network resource; the network client receiving a third party request for the said network service; the network client requesting allocation of the registered network resource; and the network client setting up a bearer path between the third party and the network resource.

According to a sixth aspect of the invention, there is provided a network resource broker including a service broker processor and a service broker registry, the service broker processor comprising: a receiver module adapted for receiving a request to register in the service broker registry a network resource for providing a network service; an authenticator module adapted for authenticating the request and to authorise registration to establish an authenticated and authorised network resource; a registration module adapted for registering the authenticated and authorised network resource in the service broker registry to establish a registered network resource; and an updating module adapted for updating a network client with the availability of the registered network resource; such that when the network client receives a third party request for the said network service, the network client requests allocation of the registered network resource; and sets up a bearer path between the third party and the network resource.

Preferably, the network resource broker further comprises a resource manager adapted for checking a status of the registered network resource before updating the network client with the availability of the registered network resource.

Advantageously, the service broker processor further comprises a monitor adapted for monitoring availability of the registered network resource.

According to a seventh aspect of the invention, there is provided a network resource registration module including a service broker processor and a service broker registry, the service broker processor comprising: a receiver to receive a request to register in the service broker registry a network resource for providing a network service; an authentication module to authenticate the request and authorise registrations to establish an authenticated and authorised network resource; and a registration module to register the authenticated and authorised network resource in the service broker registry to establish a registered network resource.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
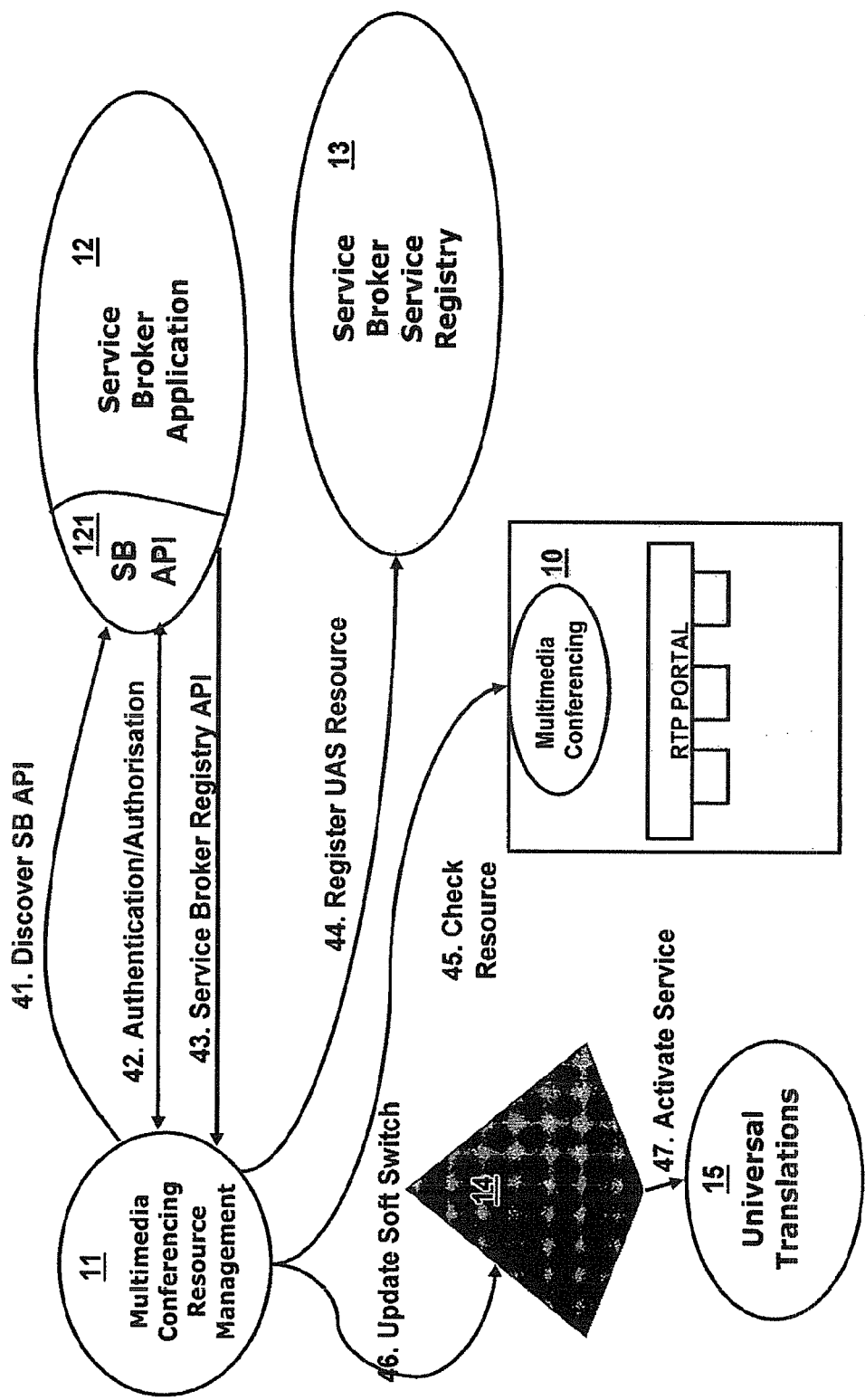
FIG. 1 is a schematic diagram of a method, according to the invention, of registering a network resource on a broker registry for brokering network services.

Throughout the description, identical reference numerals are used to identify like parts.

Figure 2:
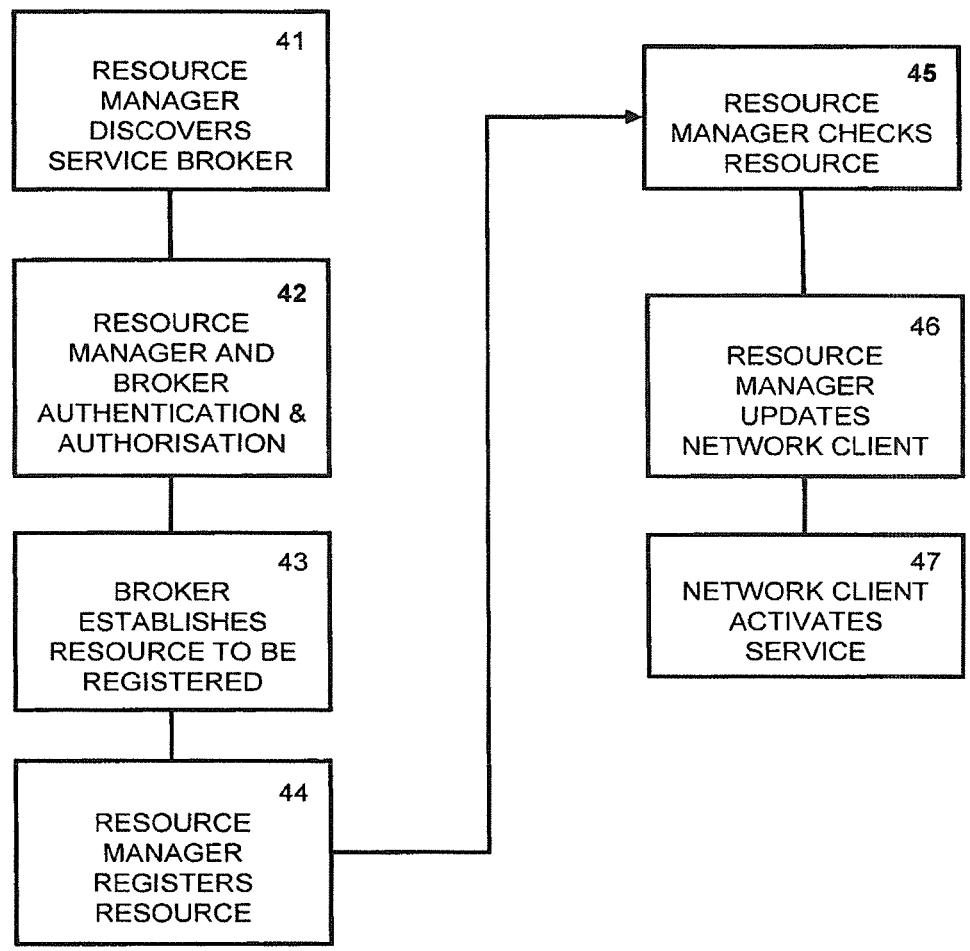
FIG. 2 is a flowchart of the method of FIG. 1.

FIGS. 1 and 2 illustrate the registration of a multimedia conferencing resource 10 for the provision of a multimedia conferencing service by a network supplier to a network user, using a service broker application 12 and a service broker resource registry 13 according to the invention. In order to make available the multimedia conferencing resource 10, a multimedia conferencing resource management module 11, finds and contacts, step 41, over a network, an application programming interface front-end 121 of the service broker application 12. In an authentication and authorisation interchange, step 42, the service broker application 12 and multimedia conferencing resource management module 11 match the facilities of the multimedia conferencing service 10, e.g. assigning a security protocol, with the needs of the service broker application 12, to determine, step 43, agreed facilities to be brokered.

The multimedia conferencing resource 10 and the agreed facilities are registered, step 44, by the multimedia conferencing resource management module 11 in the service broker resource registry 13 associated with the service broker application 12.

That is, a network resource owner registers a network resource with a network and, after passing relevant security procedures, enters details of the network resource into a network repository. The repository is a logical, i.e. virtual, entity and can be located anywhere in the network.

The multimedia conferencing resource management module 11 updates, step 46, a network client such as a soft switch 14 using a policy rule to advertise the availability of the multimedia conferencing resource 10. The policy rule may, for example, define a time slot during which the service is available. That is, the network is characterised to ensure optimal operation by interaction with a policy management infrastructure by updating access points on the network to indicate that the registered network resource is available. In the embodiment illustrated in FIGS. 1 and 2, the network client 14 activates, step 47, the service by updating a universal translation module 15.

In this manner the service broker resource registry 13 provides a central registry of network resources 10 available to a network. That is, network resource suppliers register network resources with the service broker resource registry 13 to form a collection of network resources which can be offered to third party users.

Figure 3:
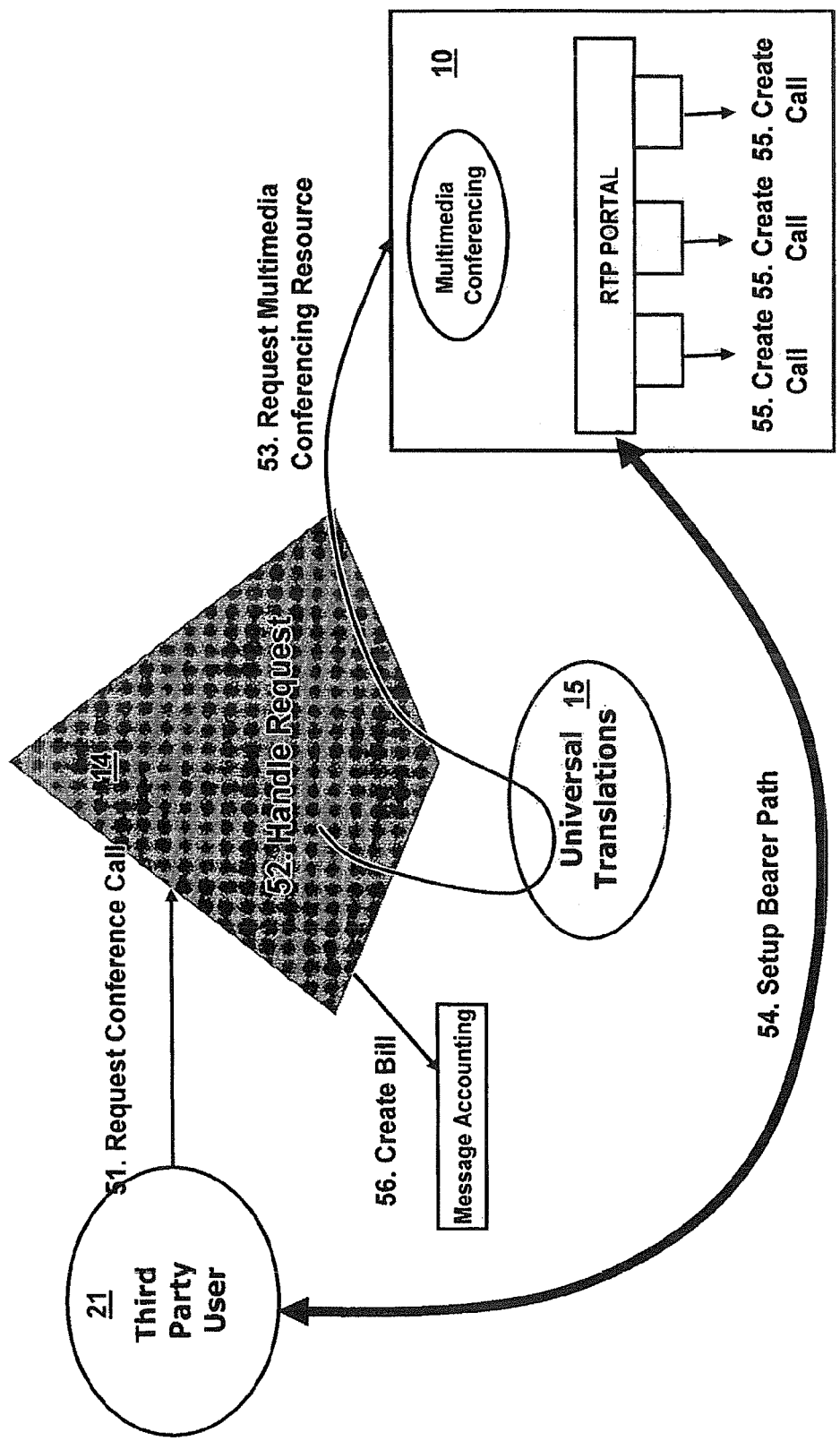
FIG. 3 is a schematic diagram illustrating a method, according to the invention, of using a brokered network resource registered on the broker registry of FIG. 1.
Figure 4:
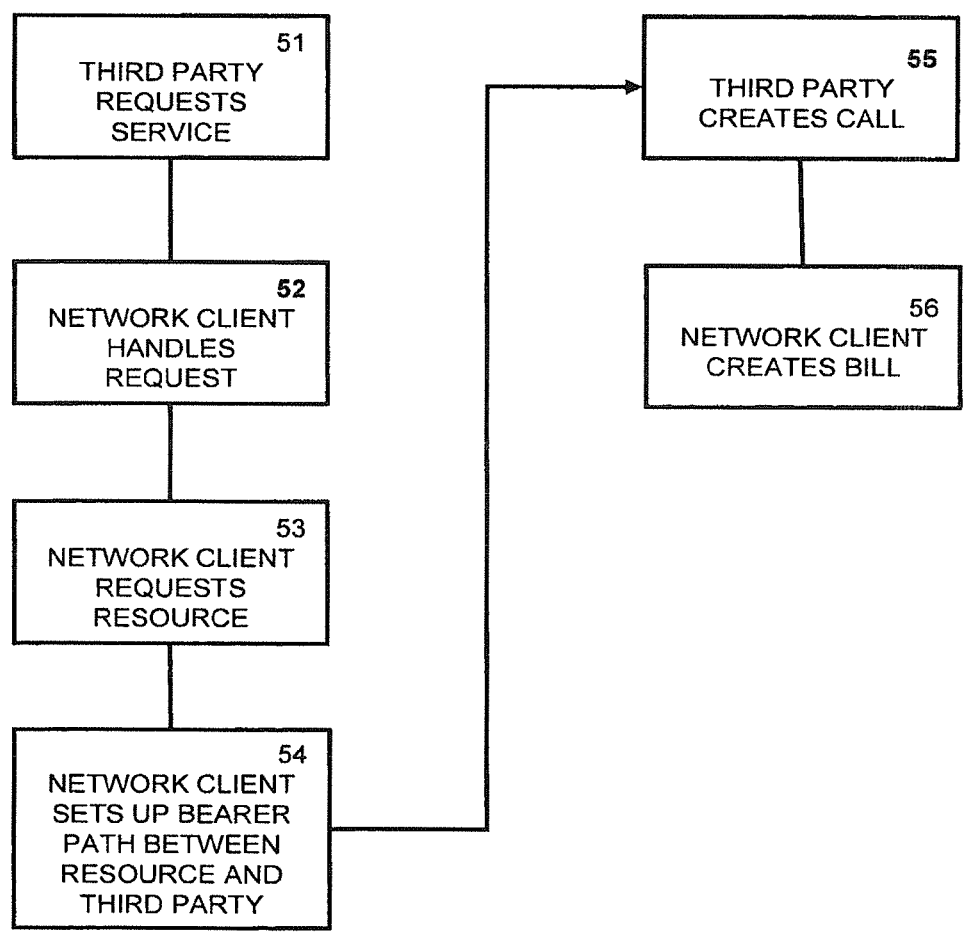
FIG. 4 is a flowchart of the method of FIG. 3.

Referring to FIGS. 3 and 4, a third party user 21, requiring a multimedia conferencing resource 10, requests a conference call from a network client such as soft switch 14. The soft switch 14 handles, step 52, the request by passing the un-interpreted request from the third party user to the universal translation module 15 which interprets the request from look-up tables as a request for conference call service and passes the interpreted request back to the soft switch 14. The soft switch 14 determines from the service broker resource registry 13 the availability of a multimedia conferencing resource 10 meeting the third party's requirements, for example least-cost routing or a particular quality of service. The service broker resource registry 13 monitors use of registered network resources so that at any time the registered network resources which are available are known. That is, the interface monitors usage of registered network resources by counting how many of the network resources are in use and allowing no more users access once all the network resources are in use. When a network resource of a particular type is in use, a notification is sent to the service broker service registry to decrement the number of network resources of that type available. The number of network resources available from this pool of network resources is increased only as the pool becomes empty. If a multimedia conferencing resource 10 meeting the third party's requirements is available, a request for the multimedia conferencing resource 10 is passed, step 53, by the soft switch 14 to the multimedia conferencing resource 10 and a transmission link bearer path is set up, step 54, between the third party user 21 and the multimedia conferencing resource 10 meeting the third party's requirements. The third party user 21 is then able to make, step 55, conference calls through a real time protocol portal 101 of the multimedia conferencing resource 10. The soft switch 14 monitors the use of the multimedia conferencing resource 10 by the third party 21 in order to create, step 56, a bill for use of the network resource by the third party.

In this manner, the third party 21 is billed only for actual use of the multimedia conferencing resource 10, and the network resource can be made available to other potential users when not in use by the third party.

More generally, a user requesting a network resource accesses a familiar resource management network entity and once the user has been authenticated by security procedures, the user can access a network resource. The familiar resource management network entity may be an internet web page which provides access to a network portal giving access to the broker. The request for a network, resource may require updating of a service profile associated with the user. That is, a list of services to which the user is allowed access is updated by adding the brokered network resource to the list, so that the network will accept a request for the brokered service from the user. This updating may be handled by interaction with a software resource adaptation layer. The user can then interact with an interface of the network resource to action the user's request for service.

Figure 5:
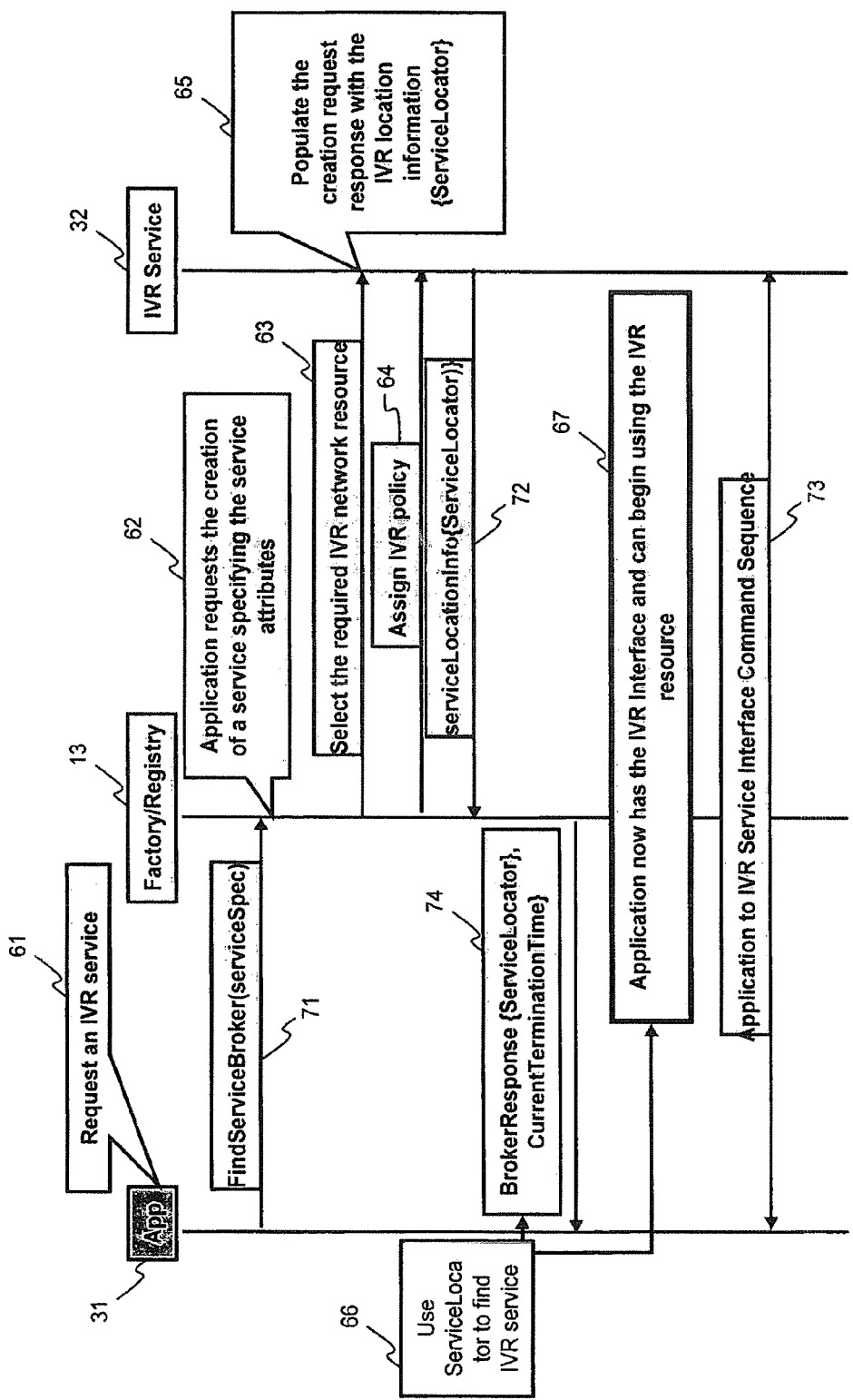
FIG. 5 is a schematic diagram of broker service information flow using the method of FIG. 3.
Figure 6:
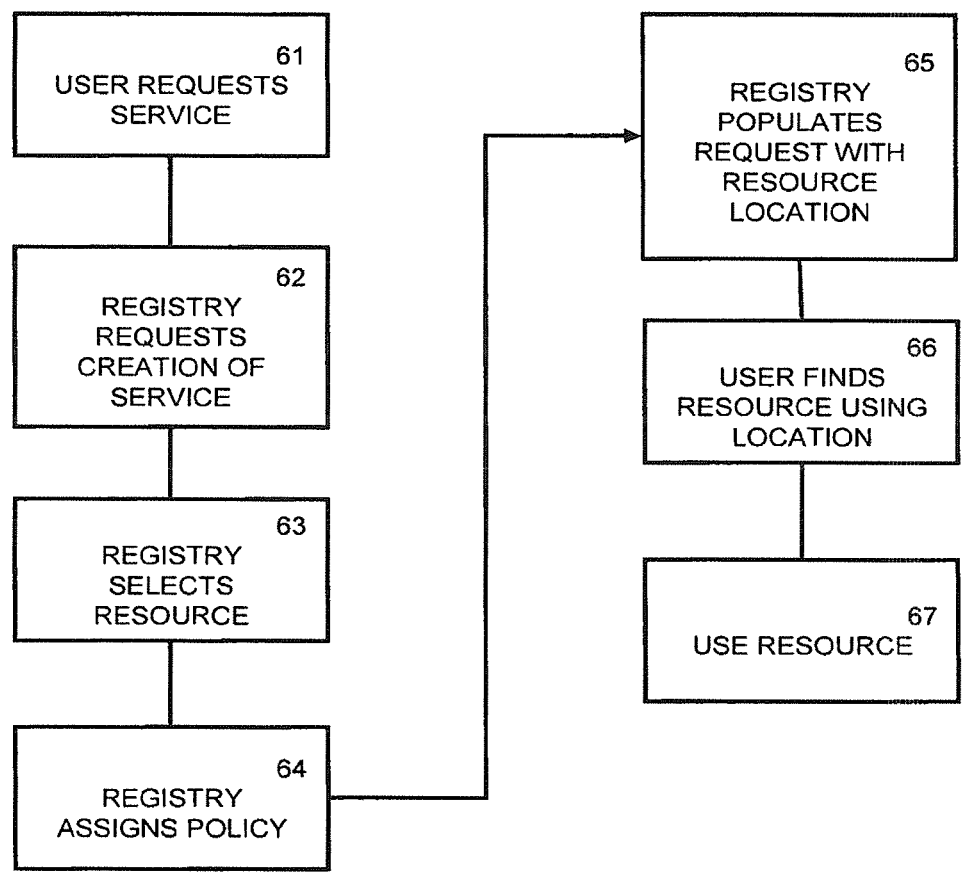
FIG. 6 is a flowchart of the information flow of FIG. 5.

An information flow of a further embodiment of the invention, for providing a menu-driven interactive voice recognition service, is illustrated in FIGS. 5 and 6. A network operator application 31, requesting, step 61, an interactive voice recognition service 32 sends a FindServiceBroker message 71 to a service broker application 12 including a registry 13. The service broker application 12 requests, step 62, the creation of an interactive voice recognition service specifying the required service attributes. The service broker application 12 selects, step 63, an available voice recognition service 32 with the required attributes from the service broker service registry 13 and assigns, step 64, a resource policy to the request. The request for service is populated, step 65, from the registry 13 with a location of the interactive voice recognition service 32 and a serviceLocationlnfo message 72 is passed to the network operator application 31. The network operator finds, step 66, the interactive voice recognition service 32 using the received serviceLocationlnfo message, and the network operator accesses an interface of the interactive voice recognition service and begins using, step 67, the network resource, by exchanging, step 73, commands between the network operator application 31 and the interactive voice recognition service 32. It will be understood that the invention is not limited to registering any particular types of network resource for providing any particular type of network service. Examples of network resources which may be registered, but to which the invention is not limited, include network resources providing any telecommunication or information technology service, such as teleconferencing, multimedia conferencing, telephone service, call forwarding service, voicemail service, internet telephone service, user validation service, billing service, gaming service, database services and data back-up services.

The invention provides an advantage of allowing a network operator to broker network resources to enable a distributed service infrastructure. For example, by providing a platform with an applications programming interface to define a broker capability, network services are made available to third parties, so that a network resource may be allocated on a time basis, for example for the working hours in a particular time zone, and the third party billed based on usage of the network resource. Outside the working hours of the particular time zone, the network resource can be made available to other users. Moreover, end-users can obtain all their telecommunication and information technology services from a single virtual source. The applications programming interface therefore handles requests for access to the broker, finds a service within the broker registry meeting the service requirements of the request, informs the user making the request of the location of the required network resource, assigns policy information to the request, for example time slots in which the service is to be provided, and records the usage time by the user of the network resource in order to bill the user for the actual usage.

The applications programming interface may provide succession brokering where, for example for a gaming service, a first registered network resource from a first vendor provides user validation, a second registered network resource from a second vendor provides secure access to a gambling site and a third registered network resource from a third vendor provides consequential billing.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

I claim:

1. A method of brokering a network resource, the method comprising, in at least one service broker processor running at least one service broker application:
    maintaining a service broker registry;
    receiving a request to register in the service broker registry a network resource for providing a network service; and
    registering the network resource in the service broker registry to establish a registered network resource.

2. The method of claim 1, further comprising billing a third party based on use of the registered network resource.

3. The method of claim 1, further comprising monitoring use of the registered network resource.

4. The method of claim 3, further comprising billing a third party based on monitored use of the selected network resource.

5. The method of claim 1, further comprising authenticating the request before registering the network resource in the service broker registry.

6. The method of claim 5, further comprising authorizing registration after authentication of the request and before registering the network resource in the service broker registry.

7. The method of claim 1, further comprising updating at least one network client regarding the availability of the registered network resource.

8. The method of claim 7, further comprising checking a status of the registered network resource before updating the at least one network client.

9. The method of claim 1, further comprising monitoring availability of the registered network resource.

10. The method of claim 1, further comprising receiving from a network client a request for allocation of the registered network resource.

11. The method of claim 10, further comprising selecting a registered network resource in response to the received request.

12. The method of claim 11, further comprising identifying the selected network resource to the network client.

13. The method of claim 11, further comprising assigning the selected network resource.

14. The method of claim 10, further comprising applying a resource policy to the received request.

15. The method of claim 10, wherein the network client is one of a network switch and a network operator application.

16. The method of claim 1, wherein the network resource is a network resource providing at least one of a telecommunication service, an information technology service, a teleconferencing service, a multimedia conferencing service, a telephony service, a call forwarding service, a voicemail service, an internet telephone service, an interactive voice response service, a user validation service, a billing service, a gaming service, a database service and a data back-up service.

17. The method of claim 1, wherein the at least one service broker processor running at least one service broker application comprises a network resource management application.

18. A method of providing a brokered network service, the method comprising, at a network client:
    receiving a request for the network service;
    sending a request for the network service to a service broker processor running a service broker application;
    requesting allocation of a network resource selected by the service broker application; and
    setting up the requested network service using the selected network resource.

19. The method of claim 18, further comprising billing a third party based on use of the selected network resource.

20. The method of claim 18, wherein setting up the requested network service comprises monitoring use of the selected network resource.

21. The method of claim 20, further comprising billing a third party based on monitored use of the selected network resource.

22. The method of claim 18, further comprising receiving identification of the selected network resource from the service broker application before requesting allocation of the selected network resource.

23. The method of claim 18, wherein setting up the requested network service using the selected network resource comprises setting up a bearer path between a source of the service request and the selected network resource.

24. The method of claim 18, wherein requesting allocation of the selected network resource comprises determining availability of the selected network resource.

25. The method of claim 18, wherein requesting allocation of a network resource selected by the service broker application comprises requesting allocation of plural selected network resources to provide the requested network service by successive brokering of the plural selected network resources.

26. The method of claim 18, wherein setting up the requested network service comprises monitoring use of the selected network resource and billing a user of the requested service based on the monitored use.

27. The method of claim 18, wherein the network client is one of a network switch and a network operator application.

28. The method of claim 18, wherein the network resource is a network resource providing at least one of a telecommunication service, an information technology service, a teleconferencing service, a multimedia conferencing service, a telephony service, a call forwarding service, a voicemail service, an internet telephone service, an interactive voice response service, a user validation service, a billing service, a gaming service, a database service and a data back-up service.

* * * * *